April 11, 1961

A. H. SIMON ET AL

2,979,706

RADIO WARNING SYSTEM

Filed July 2, 1956

INVENTORS
AVERY H. SIMON
RICHARD H. TRACY
FERN A. YARBROUGH
ATTORNEYS

April 11, 1961     A. H. SIMON ET AL     2,979,706
RADIO WARNING SYSTEM

Filed July 2, 1956     8 Sheets-Sheet 2

INVENTORS
AVERY H. SIMON
RICHARD H. TRACY
FERN A. YARBROUGH
By Fulwider Mattingly & Huntley
ATTORNEYS

United States Patent Office 2,979,706
Patented Apr. 11, 1961

2,979,706

RADIO WARNING SYSTEM

Avery H. Simon, 709 Bank of America Bldg., and Richard H. Tracy, 6364 50th St., both of San Diego, Calif., and Fern A. Yarbrough, 370 S. Fair Oaks, Pasadena, Calif.

Filed July 2, 1956, Ser. No. 595,445

2 Claims. (Cl. 340—224)

This invention relates to emergency warning systems and has particular reference to a radio alarm system for providing an automatic warning of the happening of any of a plurality of occurrences of a predetermined type, and which finds particular utility when employed for the protection of premises under circumstances where continuous human surveillance is impractical.

It has long been recognized that prompt and effective warning of emergencies is very important in preventing or minimizing the loss or damage resulting from such emergency conditions as fires, burglaries, flooding, and the like, and it has long been the practice to use protective systems of one kind or another in those cases where the property is unattended for substantial periods of time, the protection of commercial and industrial premises overnight being the most common example.

In the past, where the value of property was sufficient to warrant the cost, it has been the practice to employ guards or night watchmen to provide the desired surveillance during the hours when the premises are normally unattended. In some cases such guards or watchmen are kept continuously on duty on the premises to be protected; in other cases watchman service is provided by a single guard or watchman having a number of establishments to patrol and visit periodically during the night. In other cases, where the cost of a guard or a watchman is not justified, resort is had to alarm systems consisting of a sensing device of some character for responding to the emergency to be guarded against and connected by means of wire lines to a central office whereat a multiplicity of such lines terminate. The central office is provided with facilities for communicating with the fire department, police, or other public agency whose services are needed to combat the emergency situation.

While the present systems are reasonably adequate for close-in locations and relatively congested areas, they are relatively impractical where the premises to be guarded are at widely scattered locations or at substantial distances from the central business or manufacturing district; this is particularly true where the employment of full-time watchmen is not justified.

Detectors and wire-line connections to a central office are impractical because of the high initial and maintenance cost of the wire lines involved, and also because of the relatively long delay between the alarm and arrival of the emergency crew at the remote location. A more serious disadvantage resides in the fact that such systems ordinarily protect against only one type of emergency condition such as fire, or burglary. If it is desired to provide protection against more than one type of condition, it is often necessary to duplicate the equipment and provide a separate wire line for each type of condition to be reported.

Furthermore, under present day conditions where the tendency is toward decentralization of manufacturing and commercial facilities and the consequent location of factories and warehouses at distances measured in miles from the central business or manufacturing district, the wire lines required are so long as to make impossible the transmission of the desired intelligence without the use of great amplification of the weak signals received, or the use of repeaters spaced along the length of the line, thus adding greatly to the cost of installation and operation.

It is an object of the present invention to provide an emergency warning system which overcomes the above-mentioned disadvantages by using a plurality of sensing devices responsive to each of a plurality of different kinds of emergency conditions, the sensing devices being connected to an automatic radio transmitting apparatus for transmitting to a central station signals which cause the location of the transmitter and the type of emergency situation to be indicated and recorded at the central station.

It is also an object of this invention to provide a system of the character set forth in the preceding paragraph wherein the transmitting means includes a control mechanism responsive to operation of any of said plurality of sensing devices for causing the transmitting apparatus to execute a predetermined cycle of operations.

It is an additional object of this invention to provide a warning system of the character set forth in the preceding paragraphs which includes a means for generating and transmitting to the receiving station signals which are indicative of the location of the transmitting apparatus and indicative, also, of the type of emergency causing operation of the transmitting apparatus.

It is a still further object of this invention to provide a system of the character set forth in the preceding paragraphs which utilizes a plurality of recording media carrying said intelligence signals as a permanent recording, together with a plural channel reproducing apparatus for reproducing the signals from said plurality of recording media, and including a selector mechanism controlled by the sensing devices to select the recording medium corresponding to the operated sensing device.

It is also an object of this invention to provide an apparatus of the character set forth in the preceding paragraph wherein said intelligence signals are voice recordings comprising statements identifying the transmitter location and type of emergency represented thereby.

It is another object of this invention to provide a system of the character set forth in the preceding paragraph in which the alarm means includes an apparatus providing an audible warning and a visual indication.

It is still a further object of this invention to provide an apparatus of the character set forth in the preceding paragraphs wherein the alarm means includes apparatus for reproducing speech signals giving the location and type of emergency.

It is also an object of this invention to provide an apparatus of the character set forth above wherein the alarm means includes a decoding apparatus coacting with a visual indicating and recording means for indicating and recording the location and type of emergency.

Other objects and advantages of this invention will be apparent from a consideration of the following specification, read in connection with the accompanying drawings, wherein.

Figure 1:
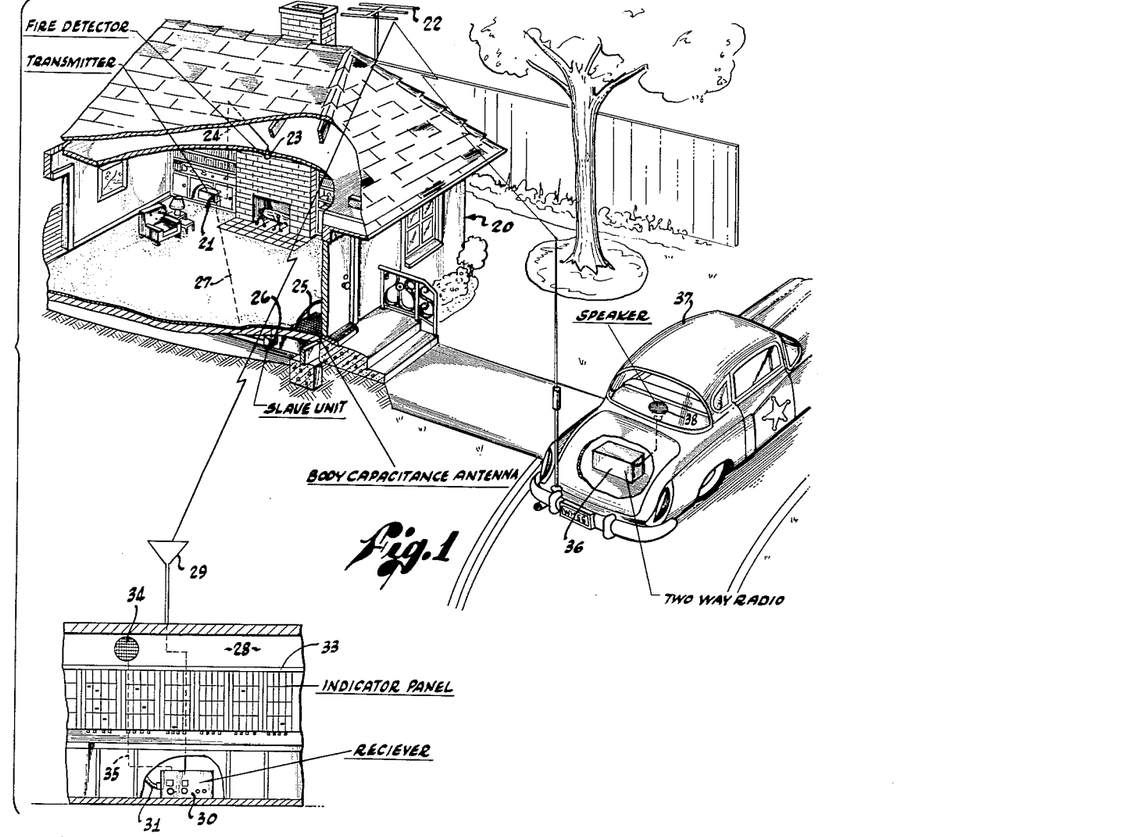
Figure 1 is a perspective view representing diagrammatically the principal components of an emergency warning system comprising a preferred embodiment of this invention.

Referring to the drawings, Figure 1 illustrates diagrammatically a typical installation of the apparatus employed in a preferred form of the emergency warning system of this invention, a house or dwelling 20 being shown as representative of the premises to be protected. In a suitable location within the dwelling 20 there is installed an automatic transmitter 21 which is connected to a suitable transmitting antenna 22. Operation of the automatic transmitter 21 is controlled by one or more detecting devices for controlling the transmitter 21 in response to the happening of an occurrence or event of an emergency nature.

By way of example, the dwelling 20 may be equipped with a fire detector 23 which is connected to the transmitter 21 as indicated at 24, and an intrusion detector comprising a body capacitance antenna 25 which is connected to the transmitter 21 through a slave unit 26 and appropriate electrical connections 27. As will be described, the transmitter 21 is not only placed in operation by actuation of any of the sensing devices to which it is connected, but its manner of operation is also so controlled thereby that the signals radiated from the antenna 22 identify the nature of the emergency as well as the location of the guarded premises.

The system also includes radio receiving apparatus, situated at a central station or location 28, and including an antenna 29 connected to a receiver 30 tuned to receive the transmissions from the transmitting antenna 22. The receiver 30 includes certain control apparatus to be hereinafter described, and is connected as by means of a cable 31 to an indicator panel 33 which is provided with a plurality of visual indicating devices arranged to be operated in response to the received signals to indicate and record the location from which the received transmissions emanate and to indicate and record the type of emergency situation requiring attention. A loud-speaker 34, connected as indicated at 35 to the receiver 30, provides an audible warning by reproduction of the received intelligence signals.

It is preferred that the transmitter 21 be arranged to transmit signals of a type and frequency suitable for direct reception on the mobile radio apparatus 36 with which official emergency vehicles, police patrol cars 37, and the like are equipped. To this end the transmitter 21 is tuned to transmit on the frequency assigned to the local police or civil defense bands, and in most cases, will transmit signals of the phase modulated type. As a consequence of this arrangement, an emergency occurrence at the dwelling 20 causing operation of the transmitting apparatus 21 will cause an alarm to be sounded through the loudspeakers 38 in the various emergency vehicles in the area. As will be explained, at least a part of the transmitted signals constitute ordinary speech broadcasts constituting a statement of the location of the dwelling 20 and a description of the emergency. This permits the police car or other emergency vehicle nearest the location of the dwelling 20 to respond immediately to the emergency call and provide the required assistance in the minimum possible time.

Figure 2:
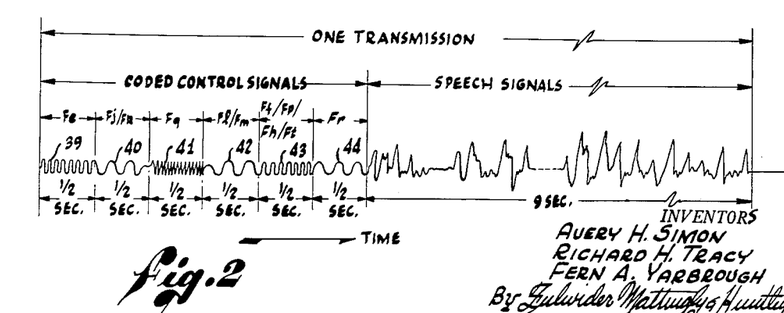
Figure 2 is a graph illustrating the character of signals radiated during a single transmission from the automatic transmitting apparatus included in the system illustrated in Figure 1.

Figure 2 is a graph illustrating the character of signals which, according to a preferred embodiment of the invention, are radiated by the automatic transmitting apparatus during a single twelve-second transmission, the intelligence signals represented being those with which the carrier frequency is modulated and which are reproduced by the loudspeakers 34 and 38 and control the functioning of the indicator panel 33.

According to a preferred embodiment of the invention, the first three seconds of each twelve-second transmission are utilized in the transmission of six coded control signals, each having a duration of one-half second. The coded control signals preferably comprise sinusoidal alternating potentials, preferably in the audio-frequency range, the first four indicated at 39, 40, 41 and 42 serving to identify the location from which the received signals emanate, the fifth indicated at 43 serving to identify the type of emergency, and the sixth represented at 44 controlling the operation of the loudspeaker 34 and the indicator panel 33.

The last nine seconds of each transmission are occupied by speech signals which, when reproduced as sound, state the address of the premises from which the signals emanate and describe the emergency situation; e.g., "Signalarm—Fire—415 South Berkeley. Repeat: at 415 South Berkeley, a fire."

As will be explained, the twelve-second transmission illustrated diagrammatically in Figure 2 is repeated in thirty seconds, the two transmissions being separated by eighteen seconds of silence during which time the transmitter 21 is actually shut down and is "off the air" to provide a minimum of interference with the normal uses of the frequency band on which the system operates.

Figures 3, 14:
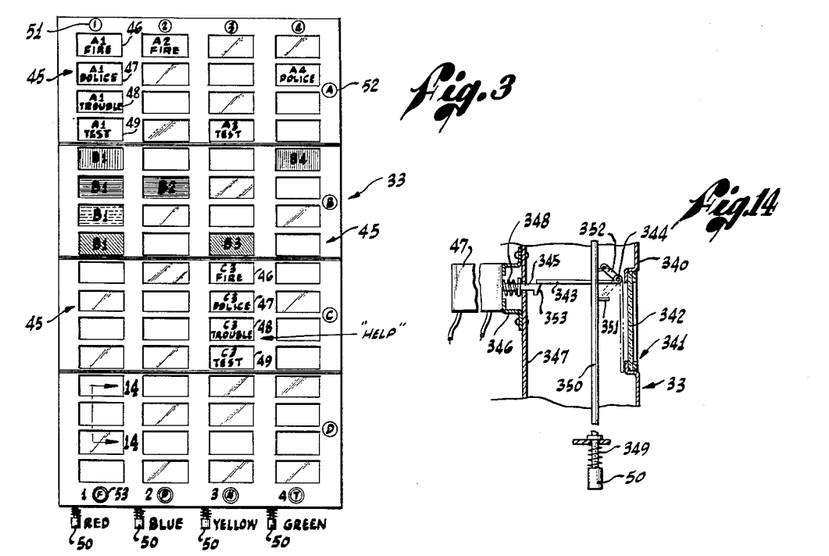
Figure 3 is an elevational view representative of a central station indicator panel used to indicate visually and to record the location and type of emergency.
Figure 14 is a fragmentary sectional view illustrating the construction of one of the registering indicators included in the indicator panel shown in Figure 3.

The system of this invention contemplates the protection of a plurality of premises, each equipped with a transmitter 21 and associated sensing devices, and the indicator panel 33 includes an indicating means identified with each of such protected premises. Figure 3 illustrates the general form and appearance of a preferred form of indicator panel which is arranged to provide the desired indication with respect to sixteen different transmitter locations, the number sixteen being selected solely for the purposes of illustration, it being understood that the system may be expanded as desired to accommodate and serve substantially any number of separate locations. In the relatively simple arrangement selected for illustration and description herein, the sixteen different locations are identified by code designations consisting of the sixteen possible combinations of the four letters "A," "B," "C," and "D" and the fourt numerals "1," "2," "3," and "4," e.g. "A1", "B4," "C3," etc., the panel illustrated in Figure 3 providing sixteen sets 45 of indicating apparatus, and a set for each of the sixteen protected premises.

The apparatus is arranged to identify which of a plurality of emergency situations obtains at the time the warning is given, and while warning of many different types of emergency situations is contemplated by this invention, there has been selected for illustration herein a system serving to identify four different types of events including a routine test and three such emergencies as fire, intrusion, and danger, the last-mentioned designation covering such emergency situations as excessive steam pressure, flooding of a basement, abnormally low fuel tank level, dangerously low water level, etc. Accordingly, each indicator group 45 comprises four separate indicators 46, 47, 48 and 49, identified respectively with the three types of emergency situations mentioned and with the test facility for testing the operation of the system.

Thus, the sixteen groups 45 of indicators may be arranged in four columns and four rows, the rows being identified by the letters "A," "B," "C," and "D" and the columns being identified by the numerals "1," "2," "3," and "4," and each of the four indicators of a given group may contain the code identification of the protected premises as is represented by the designation "A1" shown in Figure 3 for indicators 46–49.

The indicators are arranged to identify positively the type of emergency indicated; and may comprise drop annunciators, illuminated panels, or the like, bearing words descriptive of the emergency; i.e., "Fire," "Police," "Help," and "Test," alternatively, if desired, the nature of the event may be identified by appropriate colors. For example, as is represented in Figure 3 with reference to the indicators in the "B" row, the indicator may bear only the location identification (e.g., the code designation "B1") and be differently colored; red may be used to indicate "fire," blue may be used to indicate "police," yellow may represent "help," and green may indicate "test." The indicators 46–49 are preferably of the registering type to provide a permanent indication despite termination of the automatic transmissions, and may conveniently comprise conventional drop annunciators. Resetting of the annunciators after the emergency is attended to may be effected by manual reset buttons 50.

A secondary indication is also preferably given coincidentally with the reception of the transmitted signals by means of auxiliary indicating lamps associated with the rows and columns of indicators and associated with the type of event reported, indicating lamps 51 marked "1," "2," "3," and "4," serving, when illuminated, to indicate the numeral portion of the location code, and indicating lamps 52 appropriately marked "A," "B," "C," and "D" serving to provide an indication of the letter portion of that code. Likewise, four indicator lamps 53, appropriately marked "F," "P," "H," and "T," may serve by their illumination to identify the fire, police, help, and test operations. In this way should one of the annunciator type indicators fail to operate the location and type of emergency may be ascertained by observing the lighting of the indicating lamps 51, 52, and 53.

The system thus generally described provides automatic transmitting apparatus situated at each of the premises to be protected and controlled by sensing devices which are actuated by the various types of events to be guarded against. When placed in operation, the transmitting apparatus is operated for short spaced periods of time, during each of which intelligence signals are transmitted to a central location and to any mobile receiving equipment adapted to receive such transmissions. At the central station, the transmissions cause the indication and recording of an identification of the type of emergency and its location. Both at the central station and in the mobile communications equipment a verbal announcement is reproduced stating the address of the affected premises, and stating the type of emergency obtaining.

Figure 4:
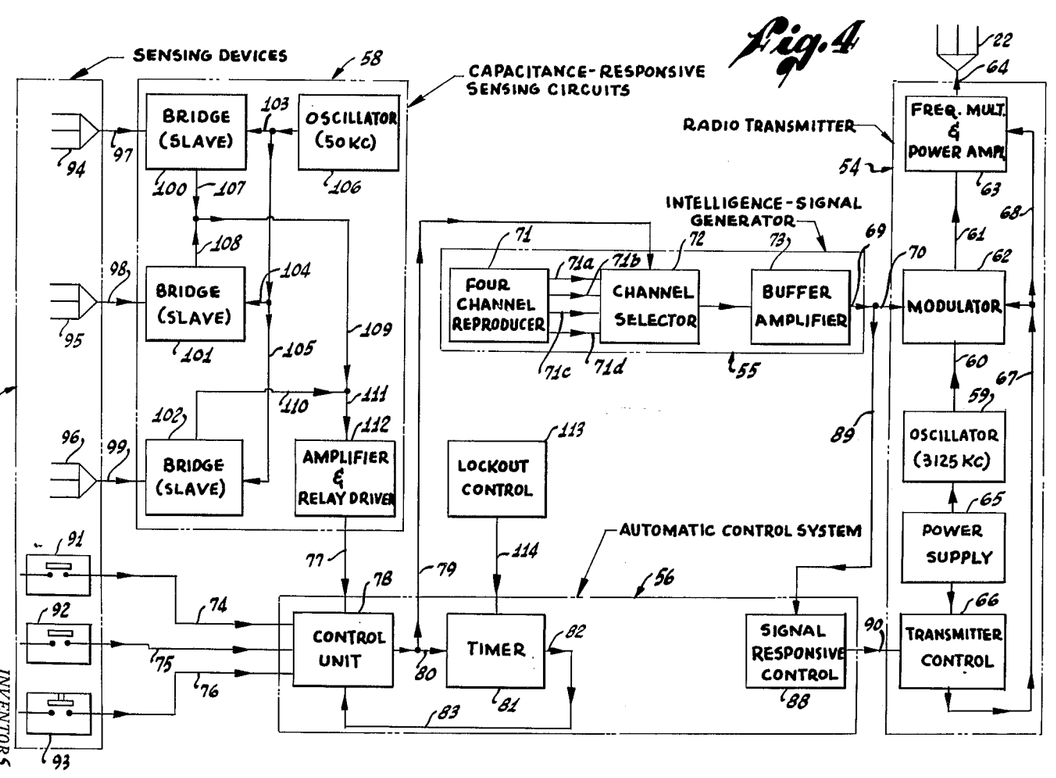
Figure 4 is a block diagram illustrating the principal components of the automatic transmitting and control apparatus and their functional interrelation.

The automatic transmitting portion of the apparatus is represented diagrammatically in block diagram form in Figure 4 as comprising a radio transmitter 54 for radiating signals modulated by intelligence signals generated by an intelligence signal generator 55. The transmitter 54 and the intelligence signal generator 55 are both controlled by an automatic control system 56 which responds to the operation of any one of a plurality of sensing devices such as are contained within the broken line 57. Certain of the sensing devices 57 are directly connected to the control system 56, whereas those used for the intrusion alarm are connected to the control system 56 through capacitance responsive sensing circuits 58.

The transmitter 54 may comprise a suitable oscillator 59, connected as indicated at 60 and 61, through a modulator 62 to a frequency multiplier and power amplifier 63. The modulated radio frequency signal delivered by the power amplifier 63 is applied to the transmitting antenna 22 as indicated at 64, modulator 62 and power amplifier 63 being supplied with suitable electric power from a power supply unit 65 through a transmitter control 66 as is represented at 67 and 68.

The intelligence signal generator 55 is the source of the intelligence signals, previously described with reference to Figure 2, and is coupled as indicated at 69 and 70 to the modulator 62 so as to correspondingly modulate the radio frequency signals generated by the oscillator 59. The intelligence signal generator preferably comprises a four-channel reproducer 71 which is arranged to deliver on four outputs 71a, 71b, 71c, and 71d electrical signals corresponding to the intelligence recorded on four separate recording media. The output circuits 71a–71d are selectively connected to the modulator 62 through a channel selector 72 and a buffer amplifier 73.

The operation of the channel selector 72 is controlled by the sensing devices 57 which are connected as indicated at 74, 75, 76, and 77 to control unit 78 the output of which is connected as indicated at 79 to the channel selector 72. As will be described, the control unit is responsive to the identity of the particular sensing device which is actuated and functions to so operate the channel selector 72 as to select the one of the four reproducer outputs 71a–71d which corresponds to the actuated sensing device.

The output of the control unit 78 is also coupled as indicated at 80 to a timer 81 which is started by the actuation of one of the sensing devices 57 and serves to measure a predetermined time interval, such as one minute, to provide at the timer output 82 a control signal which persists for the measured time interval. This control signal is fed back to the control unit 78 as indicated at 83 to hold the control unit in its operated condition for the timed interval regardless of any intervening deactuation or opening of the sensing devices 57.

A signal responsive control device 88 is connected as shown at 89 to respond to the output 69 of the intelligence signal generator 55 and is connected as shown at 90 to the transmitter control 66 to apply operating power to the modulator 62 and power amplifier 63. In this way, the transmitter 54 is caused to operate and be "on the air" only coincidentally with the generation of intelligence signals, and, in any event, for no greater period of time than the interval defined by the operation of the timer 81. At all other times the transmitter is "off the air" so as to minimize interference with the normal uses of the frequency band.

Certain of the sensing devices may comprise ordinary normally open switches adapted to complete a circuit 74, 75, or 76 to the control unit 78 upon the happening of a particular event. For example, a thermostatic switch 91 may be used to sound the alarm in case of fire, whereas a float operated switch 92 may be used to warn of flooding, and a manually operated switch 93 may be used for testing purposes.

According to one important feature of this invention, the warning of intrusion is effected by a novel proximity device arranged to close circuit 77 upon the near approach of a person to a guarded entrance or other point of access to the protected premises. To this end the protected premises are fitted with one or more body capacitance antennae 94, 95 and 96, installed in the general manner indicated at 25 in Figure 1. These antennae are connected as indicated at 97, 98 and 99 to corresponding slave units or frequency bridges 100, 101, and 102, to each of which is applied as indicated at 103, 104, and 105 a high frequency alternating potential which may be supplied by an oscillator 106, a frequency of the order of 50 kilocycles being eminently suitable for the purpose. The bridges 100–102 are normally balanced in such a fashion as to produce an output signal upon being unbalanced by the near approach of an intruder. The output signals are applied as indicated at 107–111 to an amplifier and relay driver 112 for closing the circuit 77 to the control unit 78 upon the near approach of an intruder to any one of the body capacitance antennae 94–96.

Provision for entering the protected premises without sounding an alarm is contained in a lock-out control unit 113 which is connected as indicated at 114 to the timer 81. This control is preferably in the form of a key operated switch and serves to render inoperative the timer 81, thus preventing the operation of the system until such time as the lock-out control 113 is released.

Figure 5:
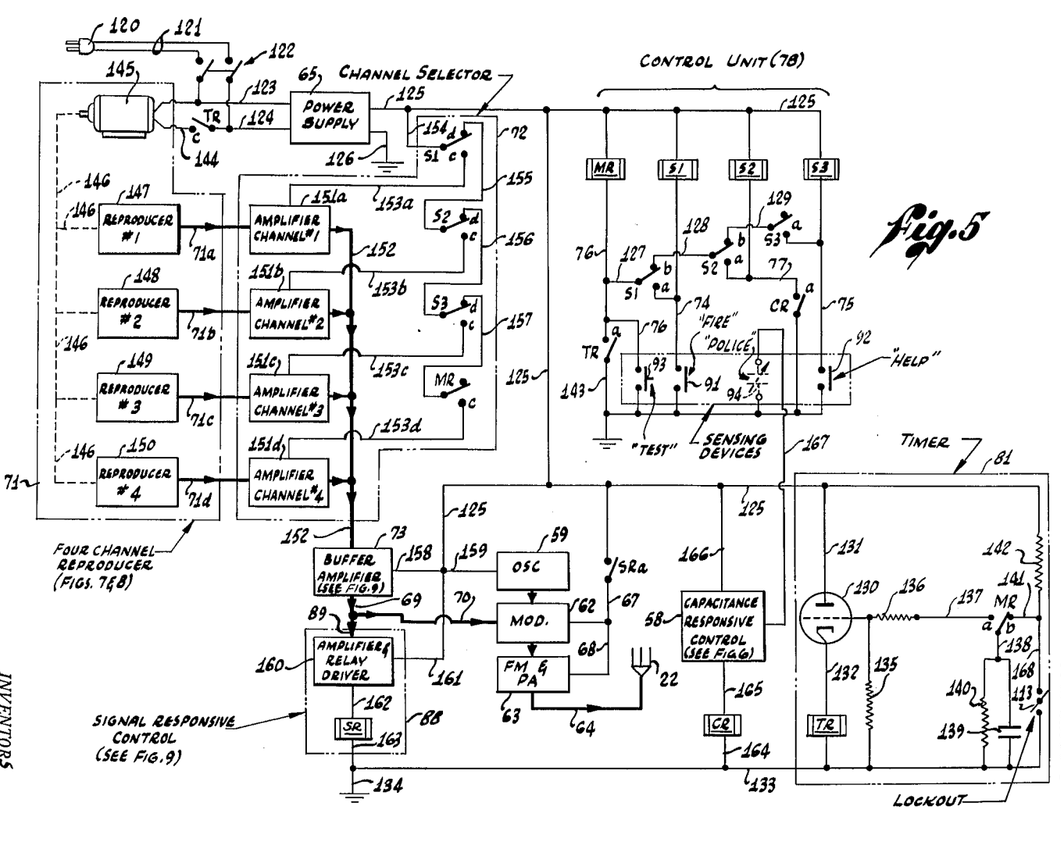
Figure 5 is a wiring diagram illustrating the automatic transmitting apparatus and the associated control mechanism.

Figure 5 constitutes a schematic wiring diagram of the entire transmitting system; the wiring for the control unit, channel selector, and timer are shown in detail, while components and sub-assemblies of conventional construction are indicated by appropriately designated rectangles as are certain other components which are illustrated in detail in other figures of the drawings as indicated by the cross-references in Figure 5.

The apparatus may be arranged for connection to a suitable source of commercial electric power by means of a conventional attachment plug 120 and attachment cord 121 connected to a main switch 122, the load side of which is directly connected as indicated at 123 and 124 to the power supply unit 65, the latter preferably being of conventional rectifier-filter construction adapted to deliver on a power supply conductor 125 a suitable direct potential which is positive with respect to the other output conductor which is grounded as indicated at 126.

The control unit 78 comprises four relays and associated circuitry. In this specification and accompanying drawings, relay designations are the same as the designations used for the relay coils and consist of one or more capital letters or arabic numerals or a combination thereof, the relay and relay coil designations being underscored to distinguish from other reference characters. Relay contacts are shown in their normal positions corresponding to a deenergized condition of the relay coil, and are not generally shown in any particular physical relation to their associated relay coils, but are placed in the drawing in locations selected to simplify the circuit arrangements illustrated; the association of relay coils and contacts being indicated by giving the contacts the same designation as the relay (without underscoring) followed by lower case letter suffixes serving to distinguish from each other two or more contacts of the same relay.

The four relays of the control unit 78 comprise a master relay MR and sensing relays S1, S2, and S3 which are controlled by the sensing devices 91, 92, 93 and the capacitance responsive sensing circuits 58, the relays each having one coil terminal connected to the power supply conductor 125 and the other terminal connected by aforementioned conductors 76, 74, 77 and 75 to sensing devices 93, 91, normally open contact CRa of a capacitance responsive relay CR, and sensing device 92, respectively, the other terminals of these latter devices all being grounded as shown in Figure 5 so that the closing of any one will energize the corresponding relay.

The master relay MR is also connected to be energized upon the energization of any one of sensing relays S1, S2, and S3. To this end, the master relay conductor 76 is connected as indicated at 127 through a normally open relay contact S1a to conductor 74, and also through a normally closed relay contact S1b to a conductor 128. Conductor 128 is connected through a normally open relay contact S2a to coil conductor 77, and through normally closed relay contacts S2b to a conductor 129. Conductor 129 is connected through normally open relay contacts S3a to coil conductor 75. Thus, actuation of any of the sensing devices 91, 92, or CRa, will energize the corresponding relay S1, S3, or S2, which, through actuation of its contacts, energizes also the master relay MR. Energization of the master relay MR starts the operation of the timer 81.

The timer 81 preferably comprises a vacuum tube 130 having its anode connected as shown at 131 to the power supply conductor 125 and having its cathode connected as by conductor 132 through the coil of a timing relay TR to a ground bus 133, the bus 133 being grounded as indicated at 134. In Figure 5, as in other figures of the drawing, the vacuum tube cathode heaters and the power supply therefor have been omitted as being conventional and well understood and so not requiring illustration or description herein. The grid of tube 130 is normally grounded through a grid resistance 135, and the resistance of the coil of relay TR is preferably so selected as to self-bias the tube 130 near cut-off so that the cathode current will be less than that required to cause operation of the relay TR.

The grid of tube 130 is connected also through a resistance 136 and conductor 137 to a normally open relay contact MRa, the other side of said contact being connected as by a conductor 138 to a capacitor 139 which is shunted by a resistance 140. Until relay MR is energized, conductor 138 is connected through normally closed relay contacts MRb, conductor 141, and resistance 142 to the positive power supply conductor 125. This circuit serves normally to hold the capacitor 139 charged to a substantial voltage, the magnitude of which is determined by the relative values of the resistances 140 and 142.

When the master relay MR is energized as previously described, conductor 138 is disconnected from conductor 141 and connected to conductor 137 by the opening of relay contacts MRb and the closing of relay contacts MRa, thus applying to the grid of the tube 130 a positive potential, the magnitude of which is determined by the potential to which the condenser is charged, and by the relative values of resistances 135 and 136. These variables are all adjusted so as to apply to the grid of the tube 130 a positive potential whereby to cause the tube to draw a substantial plate current sufficient to actuate a timing relay TR.

As soon as relay MR is actuated to cause energization of relay TR as described, capacitor 139 begins to discharge through resistance 140, and also through resistances 136 and 135, with the result that the positive potential on conductor 138 gradually reduces at a rate which is determined by the relative resistances of the discharging circuits described and the capacitance of the capacitor 139, these values being adjusted to hold the tube 130 in a conductive condition for the desired period of time, preferably about one minute. The end of the timed period is marked by the fall of the potential on the grid of tube 130 to a value sufficiently low to so reduce the plate current as to deenergize the timing relay TR and allow its contacts to return to their normal deenergized positions. The aforementioned timed period controlling the operation of the apparatus is represented by the time during which the timing relay TR is maintained in an operated condition.

Normally open relay contacts TRa are included in a circuit 143 to ground aforementioned conductor 76 for the measured time period. This maintains energized during such period master relay MR and any previously actuated sensing relays S1, S2, or S3, ground being applied to the associated relay coil conductors 74, 77 or 75 through circuit 143, relay contacts TRa and conductors 127, 128, and 129, and associated contacts of relays S1, S2, and S3. For example, if relay S2 is initially energized by the closing of relay contacts CRa and the consequent grounding of conductor 77, the ensuing closing of relay contacts S2a will connect conductor 77 through conductor 128, normally closed relay contacts S1b, and conductor 127 to aforementioned conductor 76 so as to energize relay MR. The energization of timing relay TR and the closing of contacts TRa will apply ground through circuit 143 to conductor 76 and so ground conductor 77 through the circuit just described, so as to maintain relay S2 energized, despite any subsequent opening of relay contacts CRa.

Normally open relay contacts TRa are connected between the main power supply conductor 124 and a conductor 144; conductors 123 and 144 serve to supply electric power to a driving motor 145 forming a part of the four-channel reproducer, to be described in detail hereinafter with reference to Figures 7 and 8, energization of the relay TR thus placing motor 145 in operation. Motor 145 is drivably connected as indicated by the dotted lines 146 to four reproducers or play-back units 147, 148, 149, and 150, whereby to cause simultaneous operation of those reproducers to deliver at their outputs 71a–71d electrical signals corresponding to intelligence recorded on recording media associated with each of the reproducers 147–150.

The reproducer outputs 71a–71d are applied to the inputs of associated amplifiers 151a–151d, the outputs of which are connected in parallel to a signal bus 152 as shown, the signal bus 152 constituting the input to the previously mentioned buffer amplifier 73.

Each of the amplifiers 151a–151d is provided with a power supply input conductor 153a–153d, respectively, so that the associated amplifier may be rendered operative by connecting the corresponding one of the conductors 153a–153d to the positive power supply conductor 125, thus selecting the intelligence to be carried by the radiated signal. This selection is effected by the sensing relays S1, S2, and S3 and the master relay MR, power supply conductor 125 being connected as shown at 154 through a normally open relay contact S1c to the power input conductor 153a, and also through a normally closed relay contact S1d to a conductor 155; conductor 155 is connected through normally open relay contacts S2c to the power input conductor 153b, and also through normally closed relay contacts S2d to a conductor 156; conductor 156 is connected through normally open relay contacts S3c to the power input conductor 153c, and also through normally closed relay contacts S3d to a conductor 157; and conductor 157 is connected through normally open relay contacts MRc to the power input conductor 153d. Thus, energization of any one of the relays S1, S2, S3 or MR will apply operating power to the corresponding one of conductors 153a–153d so as to render operative only the amplifier corresponding to the conductor so energized, thus selecting as the source of the intelligence signals to be radiated those produced by the operation of that one of reproducers 147–150 which corresponds to the actuated sensing device.

The signals from the selected reproducer amplifier are applied through the buffer amplifier 73 to the modulator 62 as previously described, the buffer amplifier 73 connected to the power supply bus 125 as indicated at 158. The output of the buffer amplifier 73 is applied as shown at 89 to the signal responsive control device 88 which, as is described in detail hereinafter with reference to Figure 9, comprises an amplifier and relay driver circuit 160 supplied with operating power from the power supply conductor 125 as indicated at 161, the amplifier and relay driver circuit 160 being operable in response to input signals delivered at the input 89 to supply current through an output circuit 162 to the coil of a signal responsive relay SR, the other terminal of said coil being grounded as indicated at 163 and 134.

Relay SR is energized as soon as an amplified intelligence signal is received from the output of the buffer amplifier 73, and remains energized for the duration of the intelligence signals, a period of about twelve seconds, as previously described with reference to Figure 2. Normally open relay contacts SRa are connected between the power supply bus 125 and conductors 67 and 68 serving the modulator 62 and power amplifier 63. The oscillator 59 being connected to the power supply bus as at 159, energization of relay SR places the transmitter in operation and maintains it in operation for the duration of the reproduction of intelligence signals. At the end of such reproduction, relay SR is deenergized to disconnect the modulator 62 and power amplifier 63 from the power supply conductor 125 and so terminate the transmission and take the transmitter "off the air."

With reference to sensing relay S2 and the coil conductor 77 therefor, mention has been made of normally open relay contacts CRa of a capacitance responsive relay CR. This relay has one terminal of its coil grounded as indicated at 164 and the other terminal connected as indicated at 165 to a capacitance responsive control circuit 58 which is hereinafter described in detail with reference to Figure 6, and which is supplied with operating power from the power supply conductor 125 as indicated at 166. The associated body capacitance antenna comprising sensing device 94 is connected to the capacitance responsive control circuit 58 as by means of conductor 167 and the circuitry is so arranged that the near approach of an intruder to the antenna 94 will cause energization of the relay CR to ground conductor 77 through relay contacts CRa.

The aforementioned lock-out control 113, preferably comprising a lock or key-actuated electrical switch, is connected as shown in Figure 5 between the ground bus 133 and conductor 141 as shown at 168. The apparatus is locked out by the closing of the switch 113 to ground conductor 114 and thereby prevent charging of the capacitor 139. When the capacitor 139 is fully discharged, the timing relay TR cannot be energized and none of the described automatic operations can take place.

One of the important features of this invention is the arrangement of the sensing control circuits and the channel selector circuits so as to establish predetermined relative priorities among the various emergency conditions so as to give the gravest emergencies precedence over those of lesser concern. The four sensing devices 91–94 have, for the purposes of illustration, been assigned relative priorities as follows: sensing device 91 comprising the fire detector is given the greatest importance and the capability of exercising a supervening control over all of the other three sensing devices; sensing device 94 which is responsive to the near approach of an intruder is placed second in importance; sensing device 92 to warn of a danger such as flooding, is placed third in the scale of importance; and sensing device 93 comprising a manual test button for testing the operativeness of the system, is given the lowest priority. According to this arrangement, reproducer 147 and associated amplifier 151a generate intelligence signals relating to the most urgent warning, whereas reproducer 150 and associated amplifier 151d generate intelligence signals relating to the least important of the emergency situations.

The circuitry is so arranged that upon the actuation of any of the sensing devices, the system will be placed in operation to transmit the corresponding intelligence as previously described; while the system is so operating, a second emergency will alter the operation of the system if it is of a graver nature than the first, but not if it be of lesser importance. This is accomplished by arranging the circuitry so that sensing relay S1 may exercise a supervening control over relays S2, S3, and MR, so that relay S2 may exercise a supervening control over relays S3 and MR but be subordinated to the control exercised by relay S1, and relay S3 may exercise a supervening control over relay MR, but be subordinated to relays S1 and S2.

As an example of the operation of the priority control system, it may be assumed that the near approach of an intruder has caused energization of sensing relay S2 and the consequent energization of the master relay MR and timing relay TR, relay MR being held energized through relay contacts TRa, and relay S2 being held energized through conductors 76 and 127, normally closed relay contacts S1d, conductor 128, normally open (now closed) relay contacts S2a and conductor 77. Amplifier 151b associated with reproducer 148 is in an operative condition to transmit the intelligence signals generated by the reproducer 148, the power for operating amplifier 151b being supplied through conductor 154, normally closed relay contact S1d, conductor 155, normally open (now closed) relay contact S2c and power input conductor 153d, the open condition of relay contact S2d deenergizing conductor 156 so that the closed condition of relay contacts MRc does not energize the power input conductor 153d supplying amplifier 151d.

With the apparatus in the condition described, actuation of a sensing device of lower priority such as sensing devices 92, which, for example, may be actuated by the flooding of the basement of the premises, does not alter the operation of the system. Such an event will energize relay S3 as described to close its contacts S3a and connect conductor 129 to conductor 75. Conductor 129 is, however, disconnected at its other end by reason of the normally closed relay contacts 52b having been opened by the previous energization of relay S2. Likewise the energization of relay S3 is ineffective to supply power to the amplifier 151c, since conductor 156 was previously deenergized by the opening of relay contacts S2d. Thus, actuation of sensing device 92 does not in any way alter the operation of the system as initiated by the previous energization of relay S2, this being in accordance with the assumed relative priorities placing the basement flooding emergency as a situation of less importance than the threatened burglary represented by the energization of relay S2.

If, on the other hand, a fire breaks out in the protected premises so as to actuate sensing device 91, the resulting energization of relay S1 completes a circuit between conductors 74 and 127 through relay contacts S1a to maintain relay S1 in an energized condition, and, by the opening of normally closed relay contacts S1b, disconnects conductor 128 from conductor 127 to deenergize relay S2 (unless relay contacts CRa are still closed). Furthermore, the energization of relay S1 closes relay contacts S1c to supply operating power to the amplifier 151a associated with reproducer 147, and at the same time, opens the normally closed contacts S1d so as to deenergize conductor 155 and the other three amplifiers. This then substitutes the intelligence signals produced by reproducer 147 for those produced by operation of reproducer 148. It will be seen that this result ensues regardless of whether relay S2 remains in an energized condition.

Attention is directed to the fact that the cycle of operations occurring during the predetermined period of time during which the relay TR is closed will be effected only once for each actuation of a sensing device, the apparatus being locked out until the sensing device is deactuated or another is actuated. Timer 81 is preferably adjusted to measure a period of about one minute; during this period of time, two twelve-second transmissions are effected, the transmissions being separated by a silent period of about eighteen seconds.

At the end of the measured time period, the resulting deenergization of relay TR opens the circuit to the reproducer driving motor 145 at contacts TRc and thus stops the production of intelligence signals. Relay SR, if not already deenergized, will thereupon drop out to disconnect the modulator 62 and the power amplifier 63 from the power supply conductor 125. At the same time, circuit 143 grounding conductor 76 is interrupted by the opening of relay contacts TRa. If at this time the sensing device is still in an actuated condition, the corresponding sensing relay will remain energized and will thus hold the master relay MR in an energized condition. Since the timer capacitor 139 can only be recharged by the deenergization of relay MR, the capacitor 139 remains in a discharged condition, and timer relay TR remains deenergized, this condition obtaining until the master relay MR is deenergized by the de-actuation of the sensing device.

Since, as will be described, the central station equipment includes apparatus for registering the transmitted intelligence, and since there will have been two transmissions during each of which the transmitted intelligence is reproduced as a verbal statement which may include a repetition of the pertinent data, it may be safely assumed that the message has been received and noted. By locking the apparatus against repetitive operation, congestion of the crowded frequency allocations is minimized.

Figure 6:
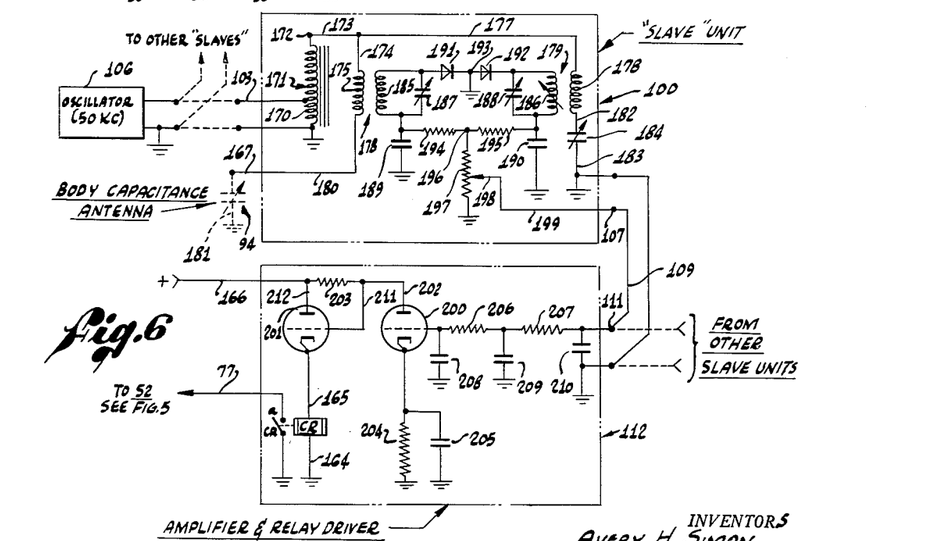
Figure 6 is a wiring diagram illustrating a novel intrusion sensing apparatus which is responsive to the near approach of an intruder.

An important feature of this invention is the provision of the hereinabove mentioned capacitance responsive sensing circuits and associated controls 58. As was described with reference to Figure 4, this apparatus comprises the oscillator 106, the amplifier and relay driver 112, and one or more slave units 100–102. Figure 6 is a schematic wiring diagram illustrating the circuitry of the amplifier and relay driver 112, and the circuitry for one of the slave units, such as unit 100.

The oscillator 106 may be of any suitable or conventional construction and generates an alternating current signal of a frequency preferably of the order of 50 kilocycles. This signal is applied, as indicated at 103, to each of the slave units.

In each slave unit the 50 kilocycle signal is applied across the primary portion 170 of an auto-transformer 171 to transform the signal to a substantially higher voltage which appears at the secondary output terminal 172. This signal is applied as at 173 and 174 to the primary winding 175 of a transformer 176, and is similarly applied as at 177 to a primary winding 178 of a second transformer 179. The other terminal of winding 175 is connected as at 180 and 167 to the body capacitance antenna 94 which, as is indicated by the dotted representation, operates as a variable capacitance returning the circuit to ground as at 181. The corresponding terminal of transformer winding 178 is connected as at 182 and 183 to ground through an adjustable capacitance 184.

Transformers 176 and 179 include secondary windings 185 and 186 which are shunted by capacitors 187 and 188, the high potential ends of these windings being bypassed to ground through capacitors 189 and 190. The tuning capacitors 187 and 188 are adjusted for resonance so as to develop across the secondary windings 185 and 186 a 50 kilocycle signal of maximum amplitude. These voltages are brought to equality by adjustment of the variable capacitance 184.

A discriminator circuit is provided for detecting any unbalance in the secondary circuit voltages as will result when the capacitance of the body capacitance antenna 94 changes due to the near approach of an intruder. This discriminating circuit includes a pair of diode rectifiers 191 and 192 connected respectively between the low potential ends of the secondary windings 185 and 186 and ground as at 193, the cathode of rectifier 191 and the anode of rectifier 192 being connected to the grounded point 193. The high potential ends of the windings 185 and 186 are interconnected by series connected resistances 194 and 195 of equal ohmic value, the point 196 of common connection between resistances 194 and 195 being connected to ground through a potentiometer 197. The movable arm 198 of the potentiometer is connected as indicated at 199 and 107 to the output conductor 109.

In operation, the point 196 is normally at ground potential (the same potential as point 193) because the transformers 176 and 179 have been adjusted to produce equal output voltages. The near approach of an intruder to the body capacitance antenna 94 increases the capacitance thereof and so reduces the circuit impedance and causes an increase in the potential across the primary 175 of the transformer 176, thus causing the voltage across the secondary winding 185 to rise above the voltage across the secondary winding 186. As a consequence, the high potential end of secondary winding 185 shifts in the negative direction so as to shift the midpoint 196 also in the negative direction to produce at that point a voltage which is negative with respect to ground. A fraction of this negative voltage, depending upon the adjustment of potentiometer 197, 198, is applied to the amplifier and relay driver 112 over conductors 199, 109, and 111 to cause energization of control relay CR, as will be described.

The amplifier and relay driver 112 utilizes two vacuum tubes 200 and 201, tube 200 having its anode connected as at 202 to the positive power supply conductor 166 through a plate load resistance 203, the cathode of tube 200 being connected to ground through a bias resistor 204 which is preferably by-passed as by a capacitor 205. The input conductor 111 is connected to the grid of tube 200 through a filter network comprising resistances 206 and 207 and associated capacitors 208, 209, and 210, the filter network 206–210 being of the "low-pass" variety and serving to exclude rapid changes in potential at point 111 and making the tube 200 responsive only to steady-state conditions. The bias resistance 204 is selected to cause the tube 200 to draw substantially saturated plate current when the grid thereof is at ground potential.

The vacuum tube 201 is arranged with its grid connected as at 211 to the anode of tube 200, and with its own anode directly connected as at 212 to the positive supply conductor 166. The cathode of tube 201 is connected to ground through the coil of control relay CR by conductors 165 and 164 as previously described. Plate load resistance 203 is made very large (preferably of the order of 6 megohms) so that the substantially saturated plate current drawn by tube 200 will reduce the voltage on the grid of tube 201 to a relatively low positive value. The coil of relay CR has a high resistance and serves as a self-biasing resistance for tube 201, to the end that tube 201 is normally biased to a point near cut-off where a minimum plate current is drawn, the minimum plate current so drawn being insufficient to actuate relay CR.

When the near approach of an intruder to the body capacity antenna 94 produces a negative voltage of sufficient magnitude on the input conductor 111, the plate current drawn by tube 200 is substantially reduced. The reduction in plate current causes the anode voltage to shift in the positive direction so as to apply through conductor 211 to the grid of tube 201 a positive signal of substantial magnitude. The application of the positive signal to the grid of tube 201 causes a great increase in the plate current drawn by that tube so as to increase the current through the coil of relay CR sufficiently to actuate the relay. Potentiometer 197, 198 of the slave unit 100 constitutes a sensitivity control; moving the movable arm 198 toward the point 196 reduces the capacitance change required to actuate the relay CR. The resulting closing of relay contact CRa connects conductor 77 to ground to energize sensing relay S2 as previously described.

Figure 7:
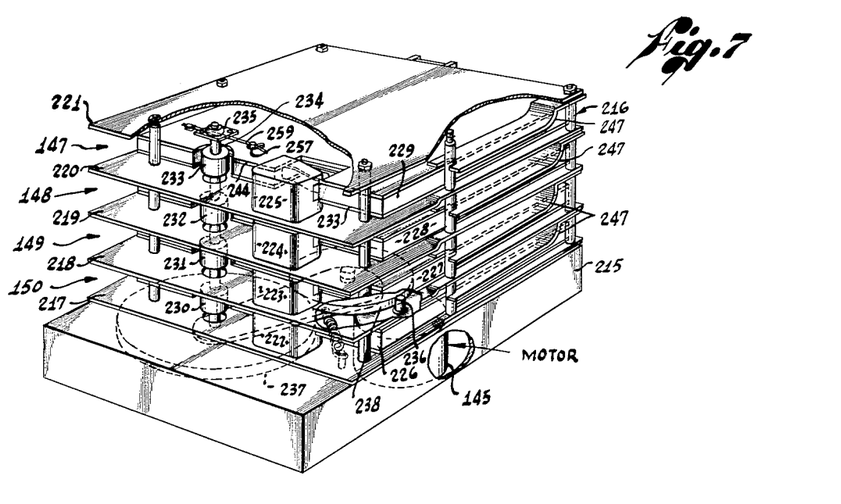
Figure 7 is a perspective view of a plural channel reproducing apparatus, parts of the apparatus being broken away to show the interior construction.
Figure 8:
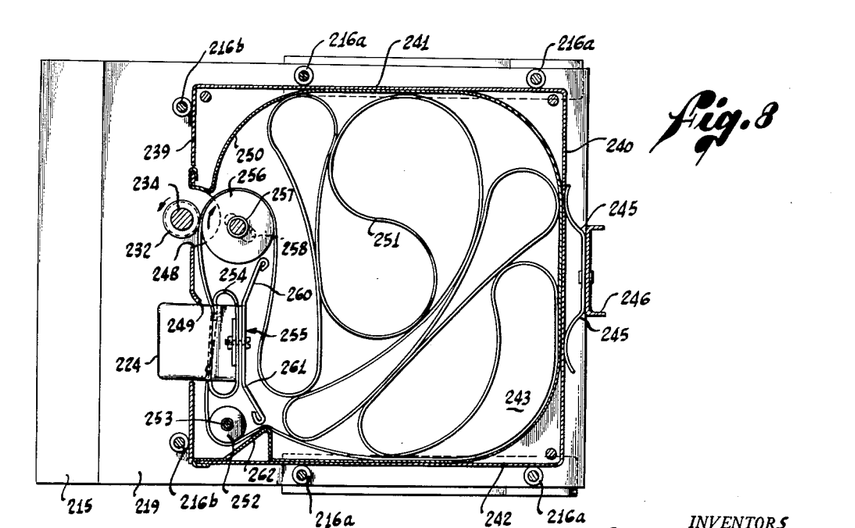
Figure 8 is a horizontal sectional view of the apparatus illustrated in Figure 7 showing the interior construction of one of the tape cartridges.

A preferred form of the four-channel reproducer 71 (Figure 4) is illustrated in Figures 7 and 8. The mechanism therein illustrated constitutes a magnetic tape reproducer arranged to accept four interchangeable and replaceable cartridges, each containing an endless loop of pre-recorded magnetic tape of sufficient length to require about one minute for the reproduction of the entire length of the loop.

As is best seen in Figure 7, the apparatus includes a base 215 within which is suitably mounted the driving motor 145. From the upper surface of the base 215 rise six columns 216 arranged to support, in spaced relation one above the other, four decks 217, 218, 219, 220 and a top cover plate 221, the four spaces therebetween accommodating the four reproducers 147–150. Upon the decks 217–220 there are mounted suitably reproducing heads 222–225 arranged to reproduce material recorded on endless loops of magnetic tape contained in replaceable cartridges 226–229.

Movement of the tapes past the heads 222–225 is effected by means of associated capstans 230–233 carried on a capstan shaft 234 which is preferably journalled in suitable bearings 235 carried on the cover 221 and the base 215. The capstan shaft 234 is drivably engaged with the shaft 236 of the motor 145 through any suitable form of driving interconnection, a conventional friction drive being diagrammatically illustrated in Figure 7 as comprising a driven wheel 237 and an idle wheel 238 interconnecting the shaft 236 with the driven wheel 237.

The motor speed, drive ratio between the motor and the capstan shaft 234, and the circumference of the individual capstans 230–233 are adjusted to produce a peripheral capstan speed of about one inch per second to allow a full minute of recording to be contained on a sixty-inch loop of tape; with good quality conventional tape play-back heads used for the transducers 222–225, one inch per second tape speed will allow the recording and reproduction of signal frequencies up to about three thousand cycles, corresponding to the maximum band width permitted by the Federal Communications Commission regulations for this type of transmission.

As is shown in Figures 7 and 8, each of the individual tape cartridges consists of a rectangular box having front and rear end walls 239 and 240, side walls 241 and 242, and bottom and top cover plates 243 and 244. The side ones of the columns 216 (identified by reference character 216a in Figure 8) are spaced to correspond to the width of the cartridge from side wall 241 to side wall 242, thus serving as aligning guides for holding the cartridges in position laterally of the assembly. The two front end columns (identified by reference character 216b in Figure 8) are spaced somewhat more closely to be engaged by the cartridge end wall 239 and serve as stops to index the cartridge position in the right and left direction as viewed in Figure 8, the cartridges being held against the columns 216b by means of springs 245 carried on a removable locking member 246, the springs 245 engaging the rear walls 240 of each of the four cartridges. The cartridges are also resiliently held in firm contact with the decks 217–220 upon which they rest by means of leaf springs 247 secured to the rear columns 216 and extending forwardly to bear against the upper cover 244 of each cartridge.

The front wall 239 of each cartridge is provided with two openings 248 and 249, the former to allow the associated capstan to enter the interior of the cartridge, and the latter for receiving the play-back head. A metal shield 250 is provided inside of each cartridge to extend across three of the four corners and provide a generally circular interior space for accommodating the various convolutions of an endless tape loop 251. Within the fourth corner of the cartridge there is placed an idle roller 252 mounted for free rotation upon a shaft 253 suitably secured at its ends to the lower and upper cover plates 243 and 244.

The tape loop 251 is passed around the idle roller 252 and over a suitable resilient pressure pad which is shown in Figure 8 as comprising a leaf spring loop 254 carried upon a suitable supporting bracket 255 secured to the lower cover plate 243. The pressure pad 254 is positioned to hold tape in firm engagement with the head 224 when the cartridge is in operative position. The tape, after passing between the head 224 and the pressure pad 254, passes between the capstan and an associated pressure roller 256 which is spring urged toward the capstan to hold the tape against the capstan with sufficient force to cause the desired feeding of the tape past the head 224.

To prevent any tendency of the tape loop to wrap around the idler 252 or roller 256, the supporting bracket 255 is provided with laterally extending guards 260 and 261 which are provided with rounded ends, as shown, positioned adjacent the roller 256 and adjacent a guiding member portion 262 of the guard 250.

From the construction described and illustrated in Figures 7 and 8 it will be seen that energization of the driving motor 145 will simultaneously rotate the four capstans 230–233, thus causing a simultaneous feeding of the four tape loops 251 past the reproducing heads 222–225. Within each cartridge, tape is drawn from the body of the loop 251 through the slot between the guard 262 and the wing 261, around the idler 252, over the associated reproducing head 222–225 against which the tape is held by the pressure pad 254, and between the roller 256 and the capstan 230–233, the tape as it leaves the capstan being discharged into the main storage portion of the cartridge.

By reason of the construction just described, the recorded material to be reproduced by any of the four pick-up heads 222–225 is readily changed merely by removing the removable locking bar 246, sliding out from between the columns 216a the particular one of the cartridges 226–229 to be changed, and sliding in between the columns a replacement cartridge containing a tape loop 251 upon which has been recorded the message or information desired to be substituted. Replacing the locking bar 246 spring urges the cartridge into seating position against the columns 216b and so brings the tape, the pressure pad 254, and pressure roller 256 into cooperative relation with the associated reproducing head and capstan.

Figure 9:
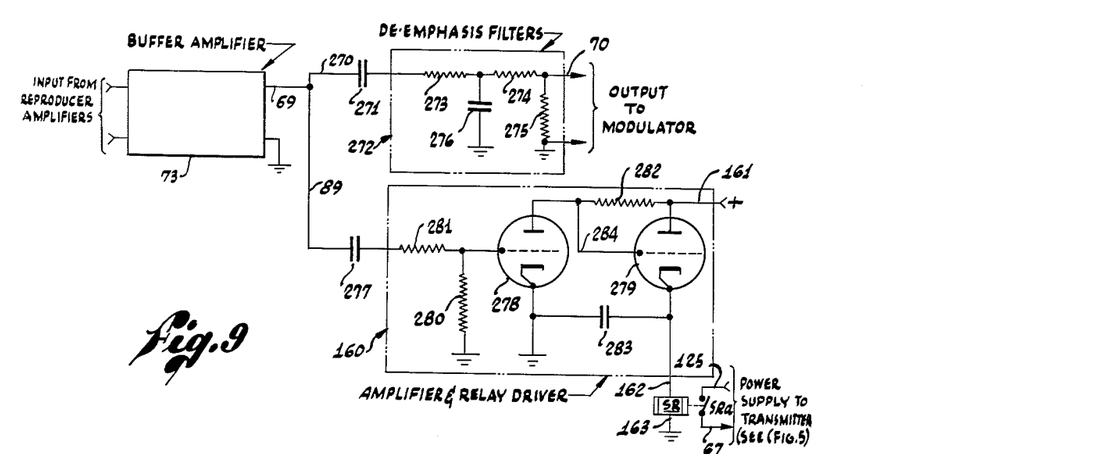
Figure 9 is a schematic wiring diagram of the signal responsive control illustrated generally in Figure 4.

The buffer amplifier 73 and signal responsive control 88 described in general terms with reference to Figure 5, are illustrated schematically in Figure 9. The buffer amplifier 73 may comprise a conventional resistance coupled amplifier stage, the amplified output signal being carried by output conductor 69. The output conductor 69 is preferably coupled as at 270 through a capacitor 271 and a de-emphasis filter indicated generally at 272 to conductor 70 which supplies the intelligence signal to the modulator 62.

The de-emphasis filter 272 preferably comprises a resistance-capacitance network comprised of resistances 273, 274, and 275 and a capacitor 276 arranged in a "band-pass" type of circuit, the values of the components being adjusted to cut off frequencies above the maximum permissible band width of 3000 cycles, and being arranged to materially attenuate frequencies below a selected lower limit, such as 150 cycles, the purpose of the low frequency attenuation being to exclude from the transmitted signal any mechanical noise components resulting from the operation of the reproducer drive motor 145, any power frequency hum components which may have gotten into the signal circuits, and any other low frequency components not contributing substantially to conveying the desired intelligence.

The output from buffer amplifier 73 is also coupled as at 89 through a capacitor 277 to the amplifier and relay driver 160, which comprises two vacuum tubes 278 and 279, tube 278 being utilized as a limiter amplifier, and tube 279 serving as a cathode follower amplifier which is directly coupled to the limiter amplifier 278.

The cathode of tube 278 is grounded, as shown, and the grid is returned to ground through a grid resistance 280 which is preferably of a high ohmic value of the order of 5 megohms. The input signal passed through the grid coupling capacitor 277, is applied to the grid of tube 278 through a series coupling resistance 281. The anode of tube 278 is connected to the positive power supply conductor 161 through a plate load resistance 282 of high ohmic value, preferably of the order of 5 megohms.

The anode of tube 279 is connected directly to the power supply conductor 161 and the cathode is connected to ground through the operating coil of relay SR as at 162 and 163, the cathode being by-passed to ground by means of a capacitor 283. The grid of tube 279 is directly connected as at 284 to the anode of tube 278.

In the absence of an input signal, tube 278 operates at zero bias and draws a high value of plate current which, because of the high resistance of the plate load 282, produces a relatively low voltage at the anode and on the grid of tube 279. The operating coil of relay SR has a relatively high resistance to cathode bias the tube 279 to a point where the plate current is insufficient to actuate the relay.

When an audio-frequency signal is applied to the grid of tube 278, the negative half cycles reduce the plate current drawn by tube 278 correspondingly; the positive half cycles, however, shift the grid of tube 278 positive with respect to the cathode so that grid current flows and the resulting low grid-to-cathode resistance limits the amplitude of the positive half cycles to a small fraction of the actual input value, the difference appearing as voltage drop across the coupling resistance 281. As a consequence, the plate current in tube 278 during the positive half cycles of the input signal is only slightly greater than the no signal plate current.

Because of the greater reduction in plate current during the negative half cycles and the slight increase only during the positive half cycles, the average plate current drawn by the tube 278 falls when an audio signal is applied to the input. This reduction in average plate current shifts the average grid voltage of tube 279 in the positive direction so as to increase the average plate current drawn by that tube. When the input signal has a sufficient magnitude, the increase in plate current of tube 279 will be sufficient to actuate relay SR to close its contacts and connect the power supply conductor 125 to conductor 67 (see Figure 5) and thus supply operating power to the modulator 62 and frequency multiplier and power amplifier 63.

Figure 10:
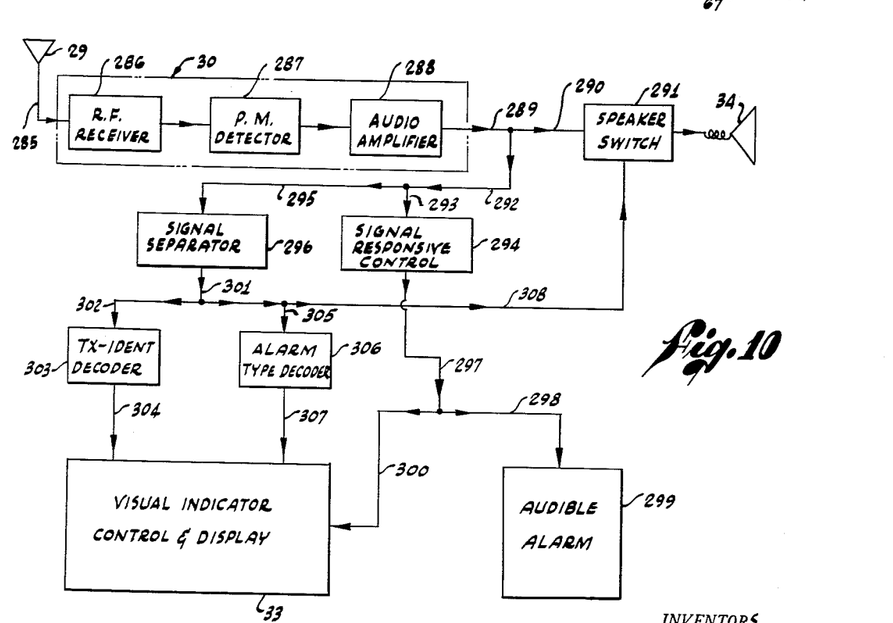
Figure 10 is a block diagram illustrating the principal components of the central station receiving apparatus and their functional interrelation.

A preferred form of receiving apparatus for installation at the central station 28 is represented in block diagram form in Figure 10. As is shown therein, the receiving antenna 29 is coupled as at 285 to the receiver 30. The receiver 30 may comprise a radio frequency amplifier 286 coupled to a phase modulation detector 287, the resulting audio-frequency signal being amplified by an audio-amplifier 288 and applied to an output conductor 289. The output conductor 289 is connected as at 290 through a speaker switch 291 to the aforementioned loudspeaker 34, the speaker switch being so controlled as to render the loudspeaker 34 operative at the appropriate times. The audio-frequency signals on output conductor 289 are also applied as at 292 and 293 to a signal responsive control device 294, and also, as indicated at 295, to a signal separator 296.

The signal responsive control device 294 is operatively coupled as at 297 and 298 to an audible alarm 299, such as a bell or buzzer, which sounds whenever audio-frequency components appear in the received signal. A similar control and display 33 serves to render such apparatus operative in response to the received audio-frequency signals.

The signal separator 296 serves to separate from each other the eleven audio-frequency signals, from four to six of which occupy the first three seconds of each transmission. The separated coded control signals are applied, as indicated at 301 and 302, to a transmitter identity decoder 303 which is coupled as at 304 to the visual indicator 33 to select for actuation that group of four indicators corresponding to the identity of the transmitter from which the received signals originated. The separated signals are also applied as at 301 and 305 to an alarm type decoder 306 which is coupled as at 307 to the indicator panel 33 to cause actuation of the appropriate one of the selected four indicators in accordance with the type of emergency represented by the signal coding. Another control signal from the signal separator 296 is applied as at 301 and 308 to actuate the speaker switch 291 and place the loudspeaker 34 in operation at the beginning of the nine-second period during which speech signals are received.

Figure 11:
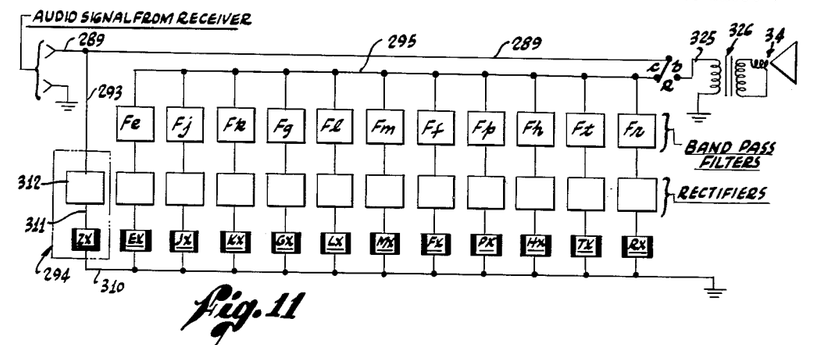
Figure 11 is a wiring diagram illustrating the signal separators and signal responsive control apparatus of Figure 10.
Figure 12:
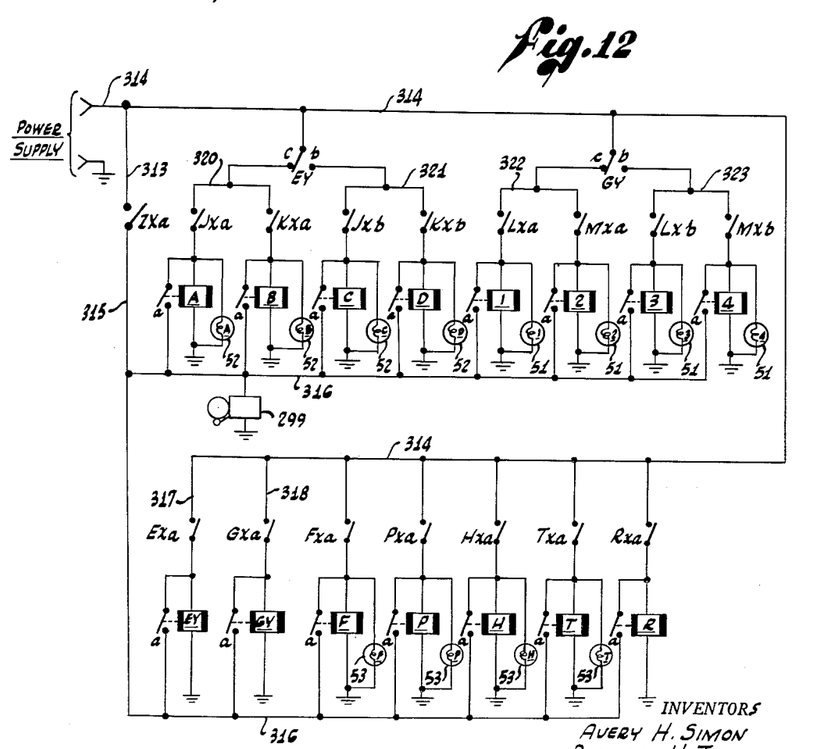
Figure 12 is a wiring diagram illustrating the decoding apparatus of Figure 10.

The schematic wiring diagrams comprising Figures 11 and 12 illustrate the detailed construction and arrangement of the speaker switch 291, the signal responsive control 294, the signal separator 296, the transmitter identity decoder 303, and the alarm type decoder 306, and include the audible alarm 299 and its actuating circuits. The signal responsive control 294 (Figure 11) comprises a relay ZX, one coil terminal of which is connected to a grounded bus 310, the other coil terminal being connected as at 311 through a suitable rectifier 312 and conductor 293 to the audio-signal bus 289 so that the relay ZX will be energized at the beginning of each transmission and will remain energized for the twelve-second duration of each transmission.

Normally open relay contacts ZXa are connected in a circuit 313 (Figure 12) extending from a power supply bus 314 through conductor 315 to a hold bus 316, the power supply bus 314 being connected to any suitable source of operating power, one side of which is assumed to be grounded, as indicated in Figure 12. The audible alarm 299, which may take the form of a bell or buzzer, is connected between the hold bus 316 and ground so as to be actuated in response to the energization of relay ZX for the entire twelve-second duration of each transmission.

The signal separator 296 is illustrated diagrammatically as comprising eleven band pass filters identified as Fe, Fj, Fk, Fg, Fl, Fm, Ff Fp, Fh, Ft, and Fr to correspond to the nomenclature herein adopted for identifying the eleven audio-frequency coded control signals. These filters all have their inputs connected to the signal bus 295 and their outputs connected through associated rectifiers to corresponding relay coils EX, JX, KX, GX, LX, MX, FX, PX, HX, TX and RX, respectively, the other terminals of said coils being connected to the ground bus 310. The signal bus 295 is normally connected to the audio bus 289 through normally closed relay contacts Rc so that one of the enumerated relays will be energized for any half-second interval during which coded signals of the corresponding frequency are received.

Contacts of relays EX and GX are arranged to preset auxiliary relays EY and GY, contacts EXa being connected in a circuit 317 extending from the bus 314 to one coil terminal of relay EY, the other coil terminal being grounded as shown. Normally open relay contacts EYa are connected between the ungrounded coil terminal and the hold bus 315 so that relay EY, once energized, will be self-held in an energized condition until relay ZX deenergizes at the conclusion of the transmission. A similar circuit 318 incorporating relay contacts GXa and relay coil GY serves to control the operation of the latter relay. Relay GY is likewise provided with a self-holding circuit extending from the ungrounded coil terminal through its own normally open contacts GYa to the hold bus 316.

Contacts of relays EY, GY, JX, KX, LX, and MX are arranged in a relay tree circuit as shown in Figure 12 to constitute the transmitter identity decoder 303. In the simplified arrangement chosen for illustration herein, provision is made for sixteen possible combinations of one of the letters "A," "B," "C," or "D" with one of the arabic numerals "1," "2," "3," or "4." The first two groups 39 and 40 (Figure 2) of the coded control signals designate the letter portion of the identification, whereas the third and fourth groups 41 and 42 designate the numerical portion of the designation. The coding system so used is set out in the following table:

TABLE I

*Transmitter identity coding*

TABLE I

| XMTR. IDENT. CHAR. | Coded Control Signals | | | |
|---|---|---|---|---|
| | First | Second | Third | Fourth |
| A | Silent | Fj | | |
| B | Silent | Fk | | |
| C | Fe | Fj | | |
| D | Fe | Fk | | |
| 1 | | | Silent | Fl |
| 2 | | | Silent | Fm |
| 3 | | | Fg | Fl |
| 4 | | | Fg | Fm |

The circuitry for setting the appropriate one of relays A, B, C, or D and the appropriate one of relays 1, 2, 3, or 4 in accordance with the above coding is illustrated in Figure 12. Relay contacts EYb and EYc are arranged to connect a branch circuit 320 to the power supply bus 314 in the deenergized condition of relay EY, and in the energized condition of the relay to connect the bus 314 to a branch circuit 321. Relays A and B have one of their actuating coils grounded as shown, and the other ends connected to branch circuit 320 through normally open relay contacts JXa and KXa, respectively. In like fashion the actuating coils of relays C and D have one terminal grounded and the other terminal connected to branch circuit 321 through normally open relay contacts JXb and KXb, respectively. Each of the relays A–D is provided with a self-holding circuit extending from the ungrounded coil terminal through its own normally open "a" contact to the hold bus 316. The aforementioned indicating lamps 52 appropriately designated "A," "B," "C," and "D," in conformity with the relay designation, are connected in parallel with the relay coils so as to indicate by their lighted condition the energization of the associated relay.

The circuitry controlling relays 1–4 is similar to that just described. Normally closed relay contacts GYc are connected in circuit between the power supply bus 314 and a branch circuit 322, and normally open relay contacts GYb are connected between the bus 314 and a branch circuit 323. The actuating coils of each of relays 1–4 have one terminal grounded as shown. The ungrounded terminals of relays 1 and 2 are connected to branch circuit 322 through normally open relay contacts LXa and MXa, respectively, and the ungrounded coil terminals of relays 3 and 4 are connected through normally open relay contacts LXb and MXb, respectively, to branch circuit 323. Each of relays 1–4 is provided with a self-holding circuit comprising its normally open "a" contact connected in circuit between its ungrounded coil terminal and the hold bus 316. The indicating lamps 51, previously mentioned with reference to Figure 3, are connected in parallel with the relay coils and marked "1," "2," "3," and "4" in correspondence with the relay designation so as to indicate by their illumination the energized condition of the corresponding relay.

The operation of the above-described relay circuitry will be apparent from the coding system set out in Table I and the electrical circuits shown in Figures 11 and 12. For example, if the received signal is transmitted from the location identified as C3, the first audio or control signal 39 (Figure 2) received from transmitter C3 comprises the frequency Fe, which energizes relay ZX to connect the hold bus 316 to the power supply bus 314 and energize the audible alarm 299. This same signal energizes relay EX which closes its normally open contacts EXa in circuit 317 to energize relay EY. Relay EY establishes its own self-holding circuit, as previously described, and connects the power supply bus 314 to branch circuit 321 through contacts EYb. The second control signal 40 (Figure 2) is the frequency F*j* which energizes relay JX to connect relay C to branch circuit 321 through contacts JX*b* and energize relay C and illuminate the corresponding one of the indicating lamps 52. Relay C is held in an energized condition by reason of the self-holding circuit originating at the hold bus 316.

The third control signal 41 (Figure 2) received from station C3 is the frequency F*g*. This is separated by the appropriately tuned band pass filter and energizes relay GX to complete circuit 318 through contacts GX*a* and energize relay GY which establishes its own self-holding circuit to the hold bus 316 through contacts GY*a* as previously described. The energization of relay GY also connects the power supply bus 314 to branch circuit 323 through contacts GY*b*.

The fourth control signal 42 (Figure 2) received from station C3 comprises the frequency F1 which upon reception causes energization of relay LX and connects relay 3 to branch circuit 323 through contacts LX*b*. Relay 3 establishes its own self-holding circuit from the hold bus 316 and illuminates the corresponding one of the indicating lamps 51. Thus, at the end of two seconds' transmission, relays C and 3 have been energized and are held in that condition by their self-holding circuits.

The fifth control signal 43 (Figure 2) will consist of one of the four frequencies F*f*, F*p*, F*h*, or F*t* depending upon the nature of the emergency situation causing operation of the automatic transmitting apparatus. The received signal will energize a corresponding one of relays FX, PX, HX, or TX (Figure 11), normally open "*a*" contacts of which are connected in circuit between the power supply bus 314 and one terminal of the actuating coil of a corresponding relay F, P, H, or T, the other coil terminals of these relays being grounded as shown in Figure 12. Each of relays F, P, H, and T is provided with a self-holding circuit consisting of its own normally open "*a*" contact connected between its ungrounded coil terminal and the hold bus 316. Thus, one of the relays F, P, H, or T, depending on the type of emergency, will be energized and will remain energized until the end of the transmission. For example, if operation is caused by the near approach of an intruder, the fifth signal 43 (Figure 2) to be received will be the frequency F*p*. The resulting energization of relay PX will energize relay P which will establish its own self-holding circuit and will also illuminate that one of the indicating lamps 53 which is correspondingly designated, the four lamps 53 being connected in parallel with their associated relays F, P, H, and T as shown in Figure 12.

The sixth control signal 44 (Figure 2) which is received from transmitter C3 is the frequency F*r* which is transmitted for the one-half second period immediately preceding the nine-second transmission of speech signals. Upon reception of the frequency F*r*, relay RX is energized closing normally open contacts RX*a* to connect one terminal of the actuating coil of relay R to the power supply bus 314 (Figure 12), the other coil terminal being grounded as shown. Relay R establishes its own self-holding circuit through its own normally open contacts R*a* which are connected between its ungrounded coil and terminal and the hold bus 316.

Energization of relay R opens normally closed contacts R*c* connecting the audio-amplifier output 289 to the signal separator bus 295 (Figure 11) and closes normally open contacts R*b* to connect the audio bus 289 to conductor 325 which supplies the loudspeaker 34 through a suitable impedance matching transformer 326, thus setting the circuitry for operation of the loudspeaker and audible reproduction of the immediately ensuing nine-second speech signal transmission. During the reception of the speech signals, the signal separator bus 295 is disconnected from the audio bus 289 to prevent inadvertent actuation of any one of the signal separator relays by reason of speech frequencies falling within the frequency bands for which the various filters are tuned. The signal responsive control 294 is, however, directly connected to the audio bus 289 so as to maintain relay ZX energized until the end of the transmission.

Figure 13:
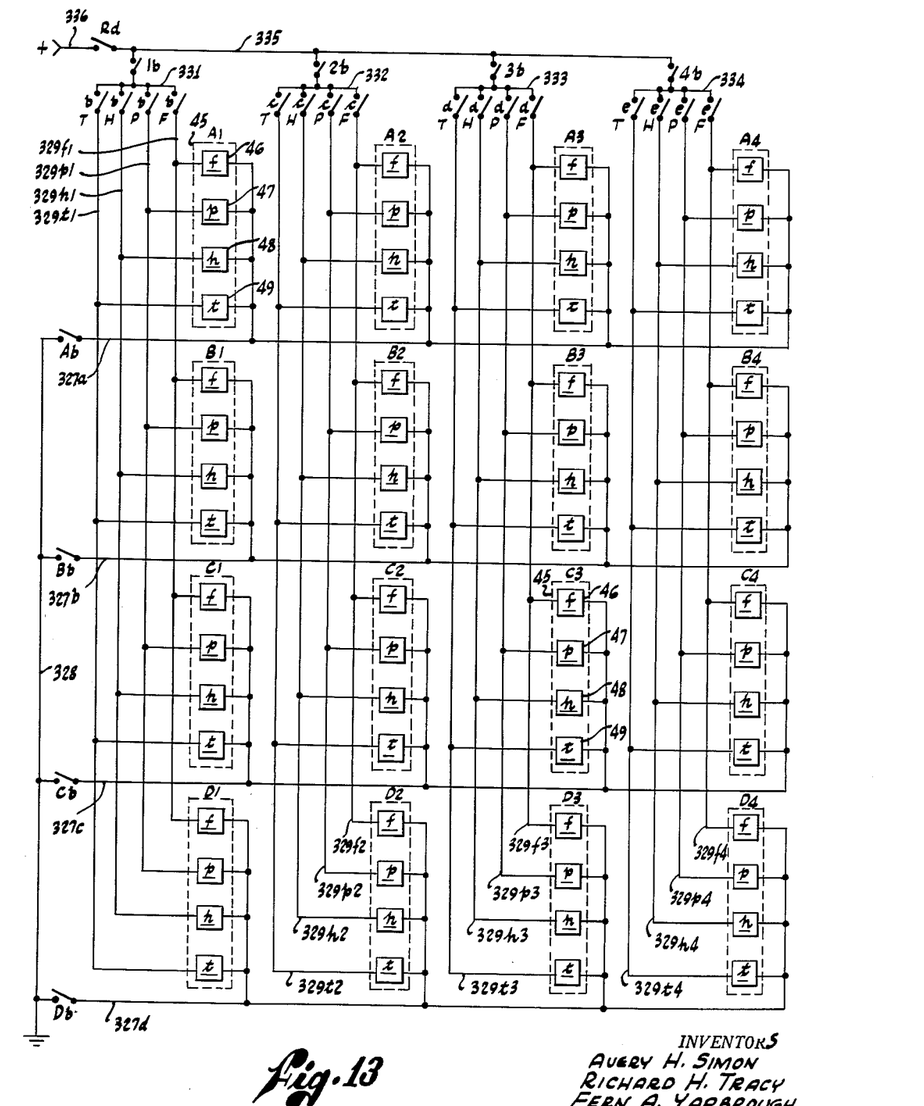
Figure 13 is a schematic wiring diagram of the central station indicator panel illustrated in Figure 3.

The manner in which energization of one of relays A, B, C, or D, and one of the relays 1, 2, 3, or 4, and one of the relays F, P, H, and T causes the desired actuation of the appropriate one of the indicators 46–49 (Figure 3) may be seen from a consideration of Figure 13 which is a wiring diagram illustrating the electrical connections employed. Each of the sixteen indicator groups 45 is represented by four actuating coils *f*, *p*, *h*, and *t*, corresponding to the indicators 46–49, previously described with reference to Figure 3, the groups being separately identified by the letter and numeral designations "A1," "A2," . . . "D4," previously explained. In the arrangement shown in Figure 3, the upper horizontal row of indicator groups is designated the "A" row, and the next three horizontal rows are designated the "B," "C," and "D" rows, respectively. Similarly, the left-hand vertical column consisting of groups "A1," "B1," "C1," and "D1" is designated the "1" column, the next to the right, the "2" column, then the "3" column and the "4" column.

All of the indicating elements of the "A" row have one terminal of their actuating coils connected to a control conductor 327*a*. In like manner one terminal of all of the actuating coils in row "B" are connected to a control conductor 327*b*; one terminal of all actuating coils of row "C" are connected to a control conductor 327*c*, and one terminal of all actuating coils of row "D" are connected to a control conductor 327*d*; control conductors 327*a*, 327*b*, 327*c*, and 327*d* are connected to a grounded bus 328 through normally open relay contacts A*b*, B*b*, C*b*, and D*b*, respectively. The other terminals of all of the indicator actuating coils are interconnected in columns in a somewhat analogous manner, all of the "*f*" coils in column "1" being connected to control conductor 329*f*1, while those in column "2" are connected to conductor 329*f*2, those in column "3" to conductor 329*f*3, and those in column "4" to conductor 329*f*4. Similarly, the *p* actuating coils are connected to conductors 329*p*1, 329*p*2, 329*p*3, and 329*p*4; and the *h* and *t* coils are similarly connected to control conductors identified by the reference character 329 followed by the suffixes "*h*" or "*t*" as is appropriate and the secondary suffixes "1"–"4" in accordance with the columnar location of the device.

Those of the 329 series of control conductors associated with the first column are connected through corresponding normally open "*b*" contacts of relays F, P, H, and T, to an auxiliary bus 331; a similar arrangement involving the "*c*," "*d*," and "*e*" contacts of relays F, P, H, and T is used to connect the four control conductors of each of the other columns to auxiliary buses 332, 333, and 334. Auxiliary buses 331–334 are connected through normally open "*b*" contacts of relays 1–4, respectively, to a power supply conductor 335 which is in turn connected through normally open relay contacts R*d* to a suitable source of operating power represented by conductor 336 and assumed to be energized from a power supply source having one side grounded.

The operation of the indicating system may best be understood by a consideration of the previously assumed example involving the reception of transmissions from the transmitter identified as C3 and caused by the near approach of an intruder, thus requiring actuation of the "police" indicator 47 of the group C3. It has already been pointed out that the end of the fifth transmission, relays C, 3, and P were energized. As a consequence, control conductor 327*c* is grounded by the closing of relay contact C*b*, power supply bus 335 is connected to auxiliary bus 333 by the closing of relay contacts 3*b*, and the auxiliary bus 333 is connected to control conductor 329*p*3 by the closing of relay contacts P*d*. A circuit is thus established from the power supply bus 335 through auxiliary bus 333 and control conductor 329p3 to the indicator coil p of group C3, which coil is connected to ground through conductor 327c. Thus, when the frequency Fr is received to cause energization of relay R, the resulting connection of the power supply bus 335 to the power supply 336 through relay contacts Rd will actuate the p indicator of group C3.

At the end of the twelve-second transmission, the transmitter goes "off the air" and the ensuing absence of signal on the audio bus 289 results in the deenergization of relay ZX which deenergizes the hold bus 316 by the opening of contacts ZXa and thereby deenergizes the energized ones of the decoder relays. Also, the audible alarm 299 is turned off, and relay R is deenergized to disconnect the loudspeaker 34 at contacts Rb and to disconnect the indicator panel 33 at contacts Rd. However, as previously stated, the indicating elements are of the registering type so that the indications set up as described above are maintained despite the deenergization of the indicator panel.

While any suitable type of "registering" element may be used for the indicating elements 46–49, the well known drop type annunciator is well adapted for such use. A suitable form of annunciator construction and the manner of mounting the same in the indicator panel 33 is shown in Figure 14 which is a fragmentary sectional view taken substantially as indicated by the line XIV—XIV in Figure 3. The indicator panel 33 may comprise a front panel 340 which is provided with appropriate window openings 341 at each of the indicator locations shown in Figure 3; the window openings 341 may be fitted with transparent closures or windows 342 as shown, if desired.

An indicating leaf 343 is provided behind each of the openings 341, each of the leaves 343 being hingedly supported as by a hinge pin 344 to allow the leaf 343 to move from a non-indicating position, as shown in solid lines in Figure 14, to an indicating position such as is shown in dotted lines, in which latter position the leaf is disposed immediately behind the window opening 341 so as to be clearly visible therethrough. The leaf 343 is arranged to fall by gravity to the dotted line indicating position, being held normally in the solid line non-indicating position by a latch member 345 which is secured or suitably connected to the plunger of a solenoid coil such as is represented at 47, the solenoid coils being suitably supported as by brackets 346 from a supporting panel 347 spaced behind the front panel 340, the latch 345 being urged by means of a spring 348 to the latch position shown.

Energization of the coil 47 withdraws the latch 345 and allows the indicating leaf 343 to drop to the indicating position. This indication will be registered; the leaf 343 will remain in the indicating position despite subsequent deenergization of the coil 47.

The reset buttons 50 which are provided for resetting the indicators of each vertical column are spring urged to the lowermost of their two positions as by a spring 349. Each of the buttons 50 is secured to a vertical actuating rod 350 which is suitably guided for up and down sliding movement as the buttons 50 are actuated or released. At the location of each of the indicators, fingers 351 are carried by the bar 350 in positions to engage crank arms 352 secured to the indicating leaves 343. Whenever one of the buttons 50 is pushed upwardly, all of the pins 351 are moved upwardly to cause swinging movement of the crank arms 352 and the leaves 343 to which they are connected, thus swinging any dropped indicators to the inoperative position. As the indicators are so moved during a resetting operation, the outermost edges engage the sloping face 353 of the latch member 345 so as to displace the latch member sufficiently to allow the leaf 343 to pass, whereupon the spring 348 returns the latch member 345 to the latching position shown in Figure 14.

It will be seen that by making the various indicators 46–49 of the registering type, such as has just been described, the desired indication is preserved beyond the termination of the radio transmission and until such time as the indication is "erased" by means of the reset buttons 50.

From the foregoing it will be observed that this invention provides a radio alarm system which will afford an automatic warning upon the happening of any of a plurality of occurrences of a predetermined type, and includes a central station apparatus for receiving the automatically transmitted signals so as to cause the location of the transmitter and the type of emergency situation to be indicated both visually and audibly and to be visibly recorded. Attention is directed particularly to the plural channel reproducer and the cooperative relation thereof with the system which selects for transmission the one reproducer corresponding to the type of emergency situation initiating operation of the apparatus. In this connection it will be observed that the specific form of multiple channel reproducing apparatus which has been illustrated and described in this application is characterized by the readily removable and interchangeable tape cartridge which provides for a simple and rapid modification or revision of any one of the sets of prerecorded signals.

Finally, attention is directed to the novel form of body capacitance sensing circuits hereinabove illustrated and described as utilized to provide a warning of the near approach of an intruder; because the sensing antenna and the rest of the apparatus can be placed in a location which is completely inaccessible to any intruder, the apparatus is not subject to by-passing by use of jumpers or the like, as are conventional metallic circuit types of burglar alarm systems.

While a preferred embodiment of the invention has been illustrated and described herein, the invention is not to be limited to the details so illustrated and described, except as defined in the appended claims.

We claim:

1 In a central station apparatus for receiving emergency warning radio signals and indicating the identity of the one of a plurality of transmitters from which the received signals emanate and indicating the nature of the emergency condition to which the warning relates, and wherein said signals comprise radio frequency signals modulated by intelligence signals the frequencies of which represent according to a predetermined code the identity of the transmitter and the emergency condition, and wherein said radio frequency signals are also modulated by speech signals constituting a verbal statement of said identity, the combination of: a radio frequency receiver for receiving said warning signals and including a demodulator providing said intelligence and speech signals at the output of said receiver; a plurality of frequency-responsive load circuits connected across said output, there being as many such circuits as there are separate frequencies in said predetermined code, each circuit being responsive to a different one of said separate frequencies and comprising in series relation an actuating coil of a relay and a narrow band filter presenting minimum impedance to alternating current of the frequency to which said circuit is responsive; a source of electric power; a secondary relay for each of said primary relays, said secondary relays being connected for energization from said source in response to actuation of the associated primary relay, said frequency-responsive load circuits and said secondary relays acting as signal separators to provide signals identifying the operating transmitter and the emergency condition causing its operation; visual indicating means connected to said secondary relay for actuation thereby, there being a plurality of said indicating means for each of said transmitters, whereby the nature of said emergency condition existing at an identified transmitter is indicated; and a loudspeaker connected to said signal separator for operation by said speech signals to reproduce said verbal statements of said identity.

2. In a central station apparatus for receiving emergency warning radio signals and indicating the identity of the one of a plurality of transmitters from which the received signals emanated, and wherein such signals comprise radio frequency signals modulated by intelligence signals the frequencies of which represent according to a predetermined code the identity of the transmitter, and wherein said radio frequency signals are also modulated by speech signals constituting a verbal statement of said identity, the combination of: a radio frequency receiver for receiving said warning signals and including a demodulator providing said intelligence and speech signals at the output of said receiver; a signal separator connected to said output for separating said speech signals from said intelligence signals and for separating into separate channels intelligence signals of different frequencies; a source of electric power; visual indicating means connected to said signal separator for actuation thereby, there being a plurality of said indicating means for each of said transmitters, whereby the nature of said emergency condition existing at an identified transmitter is indicated; a loudspeaker connected to said signal separator for operation by said speech signals to reproduce said verbal statement of said identity; and a signal responsive control operable to connect said visual indicator to said signal separator during the reception of said intelligence signals and to prevent a change in the indication by said visual indicator during the reception of said speech signals.

References Cited in the file of this patent

UNITED STATES PATENTS

| | | |
|---|---|---|
| 1,497,194 | Norden | June 10, 1924 |
| 1,863,374 | Hough | June 14, 1932 |
| 1,950,731 | Kemp | Mar. 13, 1934 |
| 1,982,771 | Von Ardenne | Dec. 4, 1934 |
| 1,986,488 | Von Ardenne | Jan. 1, 1935 |
| 2,022,991 | Walter | Dec. 3, 1935 |
| 2,064,994 | Stirlen | Dec. 22, 1936 |
| 2,140,387 | Juchter | Dec. 13, 1938 |
| 2,154,480 | Toporeck | Apr. 18, 1939 |
| 2,233,026 | Mock | Feb. 25, 1941 |
| 2,249,560 | Howton | July 15, 1941 |
| 2,250,834 | Howton | July 29, 1941 |
| 2,283,523 | White | May 19, 1942 |
| 2,371,491 | Wright | Mar. 13, 1945 |
| 2,378,299 | Hilferty | June 12, 1945 |
| 2,474,757 | Parilla | June 28, 1949 |
| 2,522,615 | Hughes | Sept. 19, 1950 |
| 2,566,121 | Decker | Aug. 28, 1951 |
| 2,574,696 | Fischler | Nov. 13, 1951 |
| 2,577,751 | Halstead | Dec. 11, 1951 |
| 2,673,975 | Kearney | Mar. 30, 1954 |
| 2,695,402 | Gray | Nov. 23, 1954 |
| 2,791,762 | Berry | May 7, 1957 |